(12) United States Patent
Peoples et al.

(10) Patent No.: US 12,137,675 B1
(45) Date of Patent: Nov. 12, 2024

(54) LIVEWELL SYSTEM

(71) Applicant: Brunswick Corporation, Mettawa, IL (US)

(72) Inventors: Andrew Peoples, Dundonald (IE); James S. Wylie, Dromore (IE); Cody Sullivan, Champaign, IL (US); Troy J. Kollmann, New Smyrna Beach, FL (US)

(73) Assignee: Brunswick Corporation, Mettawa, IL (US)

( * ) Notice: Subject to any disclaimer, the term of this patent is extended or adjusted under 35 U.S.C. 154(b) by 67 days.

(21) Appl. No.: 17/666,756

(22) Filed: Feb. 8, 2022

(51) Int. Cl.
 *A01K 63/02* (2006.01)
 *A01K 63/04* (2006.01)
 *A01K 97/05* (2006.01)

(52) U.S. Cl.
 CPC ............ *A01K 63/02* (2013.01); *A01K 63/042* (2013.01); *A01K 97/05* (2013.01)

(58) Field of Classification Search
 CPC ........ A01K 63/02; A01K 63/00; A01K 63/63; A01K 63/042; A01K 97/00; A01K 97/04; A01K 97/05
 See application file for complete search history.

(56) References Cited

U.S. PATENT DOCUMENTS

| | | |
|---|---|---|
| 3,751,845 A | 8/1973 | van Leeuwen |
| 4,070,786 A | 1/1978 | Dunham |
| 4,128,170 A | 12/1978 | Elliott |
| 4,945,672 A | 8/1990 | Raia |
| 5,167,878 A | 12/1992 | Arbisi et al. |
| 5,172,511 A | 12/1992 | Smith et al. |
| 5,305,544 A | 4/1994 | Testa, Jr. |
| 5,309,868 A | 5/1994 | Tomiyama |
| 5,582,777 A | 12/1996 | Vento |
| 5,876,639 A | 3/1999 | Campau |
| 5,950,368 A * | 9/1999 | Bradford ................. E02D 29/14 52/20 |
| 6,038,993 A | 3/2000 | Vento |

(Continued)

FOREIGN PATENT DOCUMENTS

JP          2012122189 A  *  6/2012  ................ C02F 1/00

OTHER PUBLICATIONS

Kollmann et al., "Livewell System and Method", U.S. Appl. No. 17/666,761, filed Feb. 8, 2022 (drawings and specification, including the claims, only).

(Continued)

*Primary Examiner* — Peter M Poon
*Assistant Examiner* — Carly W. Lynch
(74) *Attorney, Agent, or Firm* — Andrus Intellectual Property Law, LLP

(57) ABSTRACT

A livewell system for installation on a marine vessel includes a tank configured to hold water, a lid configured to be secured over an opening at an upper end of the tank, and an overflow outlet located proximate the upper end of the tank. When the lid is secured over the opening and the tank is filled with water, an underside of the lid is configured to contact substantially an entire upper surface of the water such that substantially no air gap is present between the upper surface of the water and the lower surface of the lid. A hybrid aerator spray head and venturi fitting coupled to the tank provides oxygenated water into the tank.

16 Claims, 6 Drawing Sheets

(56) References Cited

U.S. PATENT DOCUMENTS

| | | | | |
|---|---|---|---|---|
| 6,065,498 | A | * | 5/2000 | Campau .................. A01G 25/09 137/899 |
| 6,192,820 | B1 | | 2/2001 | Anderson et al. |
| 6,810,617 | B1 | | 11/2004 | Burroughs et al. |
| 8,572,889 | B1 | * | 11/2013 | Hughes .................. A01K 97/00 43/57 |
| 8,813,685 | B2 | | 8/2014 | Vento |
| 9,309,652 | B2 | * | 4/2016 | Mercer .................. E04D 13/08 |
| 10,990,622 | B2 | | 4/2021 | Aster et al. |
| 2008/0028667 | A1 | | 2/2008 | Grzybowski |
| 2009/0188152 | A1 | * | 7/2009 | Davin .................... A01K 97/05 43/56 |
| 2012/0291335 | A1 | | 11/2012 | Brooke et al. |
| 2016/0120163 | A1 | * | 5/2016 | Arden .................. A01K 63/042 43/57 |
| 2018/0365246 | A1 | | 12/2018 | Laster et al. |
| 2020/0033899 | A1 | * | 1/2020 | Van Haaren ........... G05D 16/20 |
| 2021/0120798 | A1 | * | 4/2021 | Ramsey .................... B32B 1/02 |
| 2021/0284293 | A1 | * | 9/2021 | Garringer ................. B63B 1/04 |
| 2021/0345588 | A1 | * | 11/2021 | Leach .................... A01K 63/02 |

OTHER PUBLICATIONS

Kollmann et al., "Smart Livewell System", U.S. Appl. No. 17/666,884, filed Feb. 8, 2022 (drawings and specification, including the claims, only).

Kollmann et al., "Oxygenation of Water in a Livewell System", U.S. Appl. No. 17/667,120, filed Feb. 8, 2022 (drawings and specification, including the claims, only).

Flowrite, "Pump-Out Aerator," brochure, pp. 29-30, admitted prior art.

TH Marine, "Max-Air Livewell Venturi Aerator," webpage, available at least since Oct. 2, 2018, https://thmarinesupplies.com/products/max-air-livewell-venturi-aerator, last accessed Oct. 7, 2021.

Marine Warehouse New Zealand, "Powerstream Aerator Nozzle Barbed," webpage, available at least since Aug. 3, 2012, https://www.marine-warehouse.co.nz/powerstream-aerator-nozzle-barbed, last accessed Oct. 14, 2021.

Kepenyes et al., "Chapter 21 Aeration and Oxygenation in Aquaulture," web article, available at https://www.fao.org/3/x5744e/x5744e0m.htm, admitted prior art, last accessed Feb. 8, 2022.

* cited by examiner

LIVEWELL SYSTEM

FIELD

The present disclosure relates to systems for maintaining aquatic life in a tank.

BACKGROUND

Current livewell systems have gaps between the underside of the lid and the upper surface of the water in the tank. These few inches of air create a "sloshing" effect when the boat is moving, causing the fish to use more energy to stay stable. If the fish are unable to remain stable, they hit the sides, top, and bottom of the livewell, causing damage to their health. Currently, some anglers insert a bung into the tank's overflow outlet and fill the tank with water until maximum capacity is reached. This is a manual process that is time consuming and risks flooding the boat.

U.S. Pat. No. 4,945,672 discloses a water circulation and aerating device for live bait containers comprising a housing removably installed in existing bait containers which has apertures in the lower portion to prevent live bait from passing therethrough while allowing passage of water into the housing when the water level within the bait container rises. An intake conduit extends through the upper portion of the housing and has one end extending into the water in the bait container and a hose at the other end extending remote from the housing and a distance beneath the surface of the body of water being fished. An exterior pump at the remote end of the intake hose pumps cool water from beneath the surface of the body of water into the bait container. A venturi tube on the intake conduit mixes air into the water being pumped into the bait container. An interior pump within the housing becomes operative upon the water entering the housing reaching a predetermined level to pump the water back into the body of water being fished. Thus, the water introduced into the bait container is the same temperature as the body of water being fished and is aerated with fresh air and the warmer water discharged from the bait container will also contain metabolic wastes and nitrates created by the concentrated population.

U.S. Pat. No. 5,876,639 discloses an improved aerator for oxygenating water and generating a circulating current within a livewell or baitwell while minimizing damaging turbulence. The aerator includes a downstream expansion area to reduce exit velocity, and an air intake conduit positioned to minimize stagnation of the liquid flow. The new aerator has an increased negative aspiration pressure, and can be operated at lower depths than previously possible.

U.S. Pat. No. 6,810,617 discloses a livewell tank for use on a boat and having a bottom and a sidewall section forming an interior compartment. A top is coupled with the sidewall section and extends inwardly to cover the interior compartment about the periphery of the sidewall section. An overflow drain is located proximate the top of the tank and a baffle inhibiting turbulent flow is positioned between the overflow drain and the bottom of the tank.

U.S. Patent Application Publication No. 2012/0291335 discloses a livewell for storing and/or transporting live fish, and an insert for a livewell, including a padding system that is disposed between at least one wall of the tank one or more fish. The livewell or the insert may include one or more sensors, wherein the one or more sensors provide monitoring of oxygen, temperature, pH, and/or ammonia in the water of the livewell. The livewell or the insert may further include apparatus that performs at least one function selected from circulating, oxygenating, filtering, and chilling water in the livewell, optionally in accordance with at least one corresponding sensor. The padding system may include one or more portions that divide the livewell into two or more chambers, each chamber adapted to accommodate a fish. In one embodiment, the padding system comprises at least one pouch adapted to accommodate a fish.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a livewell system for installation on a marine vessel comprises a tank configured to hold water, a lid configured to be secured over an opening at an upper end of the tank, and an overflow outlet located proximate the upper end of the tank. The tank and lid are configured such that when the lid is secured over the opening and the tank is filled with water, an underside of the lid is configured to contact substantially an entire upper surface of the water.

In one example, an overflow shutoff is configured to prevent water from flowing out of the tank via the overflow outlet when the lid is secured over the opening. In one such example, the overflow shutoff comprises a cover coupled to the underside of the lid, and the cover is configured to block an upstream end of the overflow outlet when the lid is secured over the opening. In another such example, the overflow shutoff comprises a valve controlling flow of water through the overflow outlet, and the valve is configured to be closed automatically in response to the lid being secured over the opening.

In one example, the livewell system further comprises a pump configured to provide water to the tank and a sensor configured to determine whether substantially the entire upper surface of the water in the tank is contacting the underside of the lid. The pump is configured to stop providing water to the tank in response to the sensor determining that substantially the entire upper surface of the water in the tank is contacting the underside of the lid. In one such example, the sensor is configured to sense a pressure in the tank, and the pump is configured to stop providing water to the tank in response to the pressure in the tank exceeding a predetermined pressure threshold. In another such example, the sensor is configured to sense a level of the water in the tank, and the pump is configured to stop providing water to the tank in response to the level of water in the tank reaching a predetermined level.

In one example, the lid comprises a protruding lower portion that is configured to extend below the upper end of the tank when the lid is secured over the opening, and the protruding lower portion comprises the underside of the lid that is configured to contact substantially the entire upper surface of the water.

In one example, the livewell system comprises a hybrid aerator spray head and venturi fitting coupled to the tank. The hybrid aerator spray head and venturi fitting is configured to provide oxygenated water into the tank both when an outlet of the hybrid aerator spray head and venturi fitting is submerged in the water in the tank and when the outlet is not submerged in the water.

According to another example of the present disclosure, a system for providing oxygenated air to aquatic life comprises a tank configured to hold water in which the aquatic life is to be placed, a lid configured to seal an upper end of the tank, and a hybrid aerator spray head and venturi fitting coupled to the tank and configured to provide oxygenated water into the tank. The tank and lid are configured such that when the lid is sealing the upper end of the tank and the tank is filled with water, substantially no air gap is present between an upper surface of the water and a lower surface of the lid. The hybrid aerator spray head and venturi fitting is configured to provide oxygenated water into the tank both when an outlet of the hybrid aerator spray head and venturi fitting is submerged in the water in the tank and when the outlet is not submerged in the water.

In one example, a pump is configured to provide water to the tank via the hybrid aerator spray head and venturi fitting, and a sensor is configured to determine whether an air gap exists between the upper surface of the water and the lower surface of the lid. The pump is configured to stop providing water to the tank in response to the sensor determining that substantially no air gap is present between the upper surface of the water and the lower surface of the lid.

In one example, an overflow outlet is located proximate the upper end of the tank, and an overflow shutoff is configured to prevent water from flowing out of the tank via the overflow outlet when the lid is sealing the upper end of the tank.

In one example, the lid comprises a protruding lower portion that is configured to extend into the upper end of the tank when the lid is sealing the upper end of the tank, and the protruding lower portion comprises the lower surface of the lid.

BRIEF DESCRIPTION OF THE DRAWINGS

Examples of livewell systems are described with reference to the following Figures. The same numbers are used throughout the Figures to reference like features and like components.

DETAILED DESCRIPTION

Figure 1:
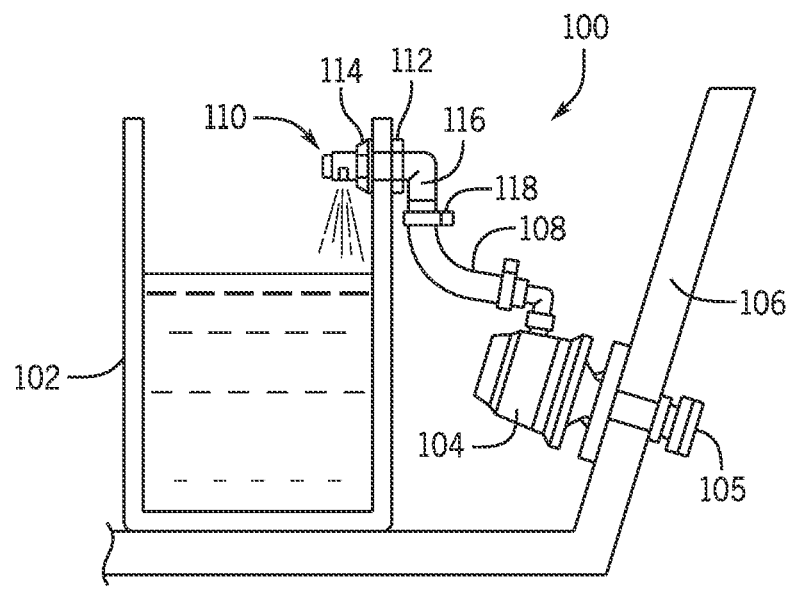
FIG. 1 illustrates one example of a prior art livewell system installed on a marine vessel.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

As used here, the term "livewell" is broader than its typical use, and encompasses any holding tanks, livewells, baitwells, or fish tanks, whether boat-mounted or not, configured to contain water for supporting aquatic life. For example, livewells are used to hold fish or other aquatic animals that are intended to be transferred back to the water from which they were caught or into another tank.

Typically, a livewell system is installed on a marine vessel in one of two ways. Referring to FIG. 1, the livewell system 100 shown therein includes a tank 102 configured to hold water, which is provided to the tank 102 by a pump 104 that extends through the hull 106 of the marine vessel and into the body of water in which the marine vessel is operating. The pump 104, which includes a strainer on or near its inlet 105, draws water from the body of water in which the marine vessel is operating and pumps it through a hose 108 to an aerator spray head 110, which sprays the water into the tank 102. The aerator spray head 110 includes a fitting extending through the wall of the tank 102, which is held in place by a flange 112 and an adjustable nut 114. The hose 108 is held to a hose barb 116 at the end of the fitting by way of a hose clamp 118.

Figure 2:
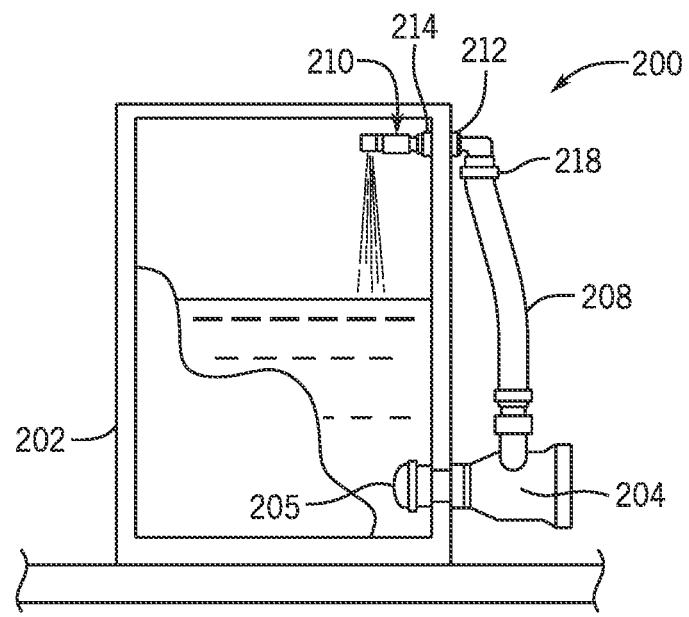
FIG. 2 illustrates another example of a prior art livewell system installed on a marine vessel.

In another prior art livewell system 200, as shown in FIG. 2, instead of being drawn from the body of water in which the marine vessel is operating, water is drawn into the pump 204 via pump inlet 205 situated in the tank 202. Recirculated water is pumped through the hose 208 and back into the tank 202 via aerator spray head 210. Other components not specifically described with respect to FIG. 2 are similar to those with like numbering described hereinabove with respect to FIG. 1.

Through research and development, the present inventors have discovered that sloshing within a livewell tank, as a result of movement of the boat or other external factors tending to jostle the tank, results in damage to the aquatic life therein. Such sloshing requires the aquatic animals inside the tank to use more energy to remain stable. If the fish are unable to remain stable, they hit the sides, top, and bottom of the tank, causing damage to their health. The present inventors have therefore developed livewell systems in which minimal or no room is provided between the lower surface lid of the tank and the upper surface of the water within the tank, thereby reducing or eliminating such sloshing. The present inventors have developed two types of livewell systems in which the underside of the lid is configured to contact substantially an entire upper surface of the water: a first type in which the livewell tank is overfilled (see, for example, FIGS. 3 and 4) and a second type in which the underside of the lid extends downwardly toward the upper surface of the water (see, for example, FIG. 5). Further, the present inventors have realized that in such a system, wherein there is little or no air gap between the upper surface of the water and the lower surface of the lid, a typical aerator spray head will adequately aerate the water within the tank. Thus, the present inventors have developed a hybrid aerator spray head and venturi fitting that is capable of aerating water in the tank regardless of whether its outlet end is submerged in water.

Figure 3:
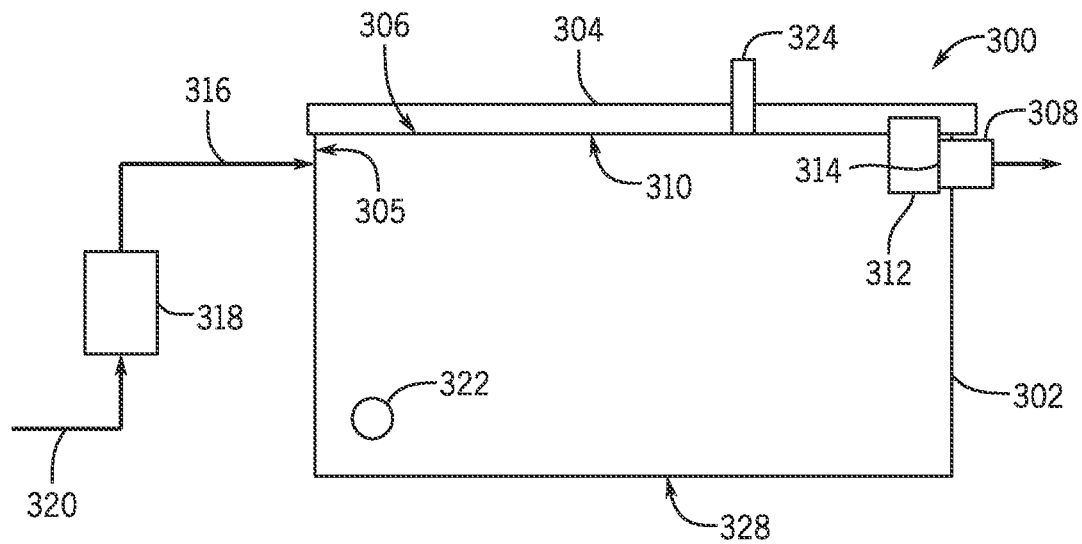
FIG. 3 illustrates one example of a livewell system according to the present disclosure, the livewell system being operable in an overfill configuration.

Referring to FIG. 3, according to one example of the present disclosure, a livewell system 300 for installation on a marine vessel comprises a tank 302 configured to hold water and a lid 304 configured to be secured over an opening 305 (see also 705, FIG. 7) at an upper end 306 of the tank 302. The tank 302 and lid 304 can be made of the same or different materials, which may include any type of suitable plastic, fiberglass, foam, or combinations thereof. The lid 304 is provided with a perimetral edge that fits tightly within or around the opening 305 in the tank 302 so that water cannot slosh out of the tank 302 when the lid 304 is secured in place. The lid 304 may fit over and around the perimetral upper edge of the tank 302 as shown herein, or may sit on a recessed flange formed around an opening in an upper wall of the tank 302. The lid 304 can be connected to the tank 302 by a hinge or can be fully removable from the tank 302. The tank 302 and lid 304 can have any shape suitable for holding water and aquatic life therein. The exact configuration of the tank 302 and lid 304 is not limiting on the scope of the present disclosure, and many different shapes, materials, and lid configurations are known in the art and suitable for use with the modifications disclosed herein.

An overflow outlet 308 is located proximate the upper end 306 of the tank 302. The overflow outlet 308 can be a pipe, tube, or hose inserted through a hole formed in the wall of the tank 302. The overflow outlet 308 may be provided with a one-way (check) valve that opens only once a certain pressure of water in the tank 302 is applied to the valve. (See, for example, check valve 532, FIG. 5.) Alternatively, the overflow outlet 308 may simply be a hole in the wall of the tank 302. The overflow outlet 308 may be provided with a screen or other type of suitable device for preventing anything but water (such as fish) from exiting via the overflow outlet 308. Generally, the overflow outlet 308 will be in fluid communication with a hose or other conduit that directs any water that exits the tank 302 via the overflow outlet 308 to a desired location, such as the bilge of a boat or overboard.

According to the present example, the tank 302 and lid 304 are configured such that when the lid 304 is secured over the opening 305 and the tank 302 is filled with water, an underside 310 of the lid 304 is configured to contact substantially an entire upper surface of the water. By "substantially an entire upper surface" it is meant to include configurations in which a negligible portion of the upper surface of the water is not contacted by the underside 310 of the lid 304, while still preventing sloshing. Although what is considered negligible may therefore vary based on the size and configuration of the tank 302 as well as the external forces acting on the tank 302, it is contemplated that at least about 90% of the upper surface of the water is contacted by the underside 310 of the lid 304.

Figure 9:
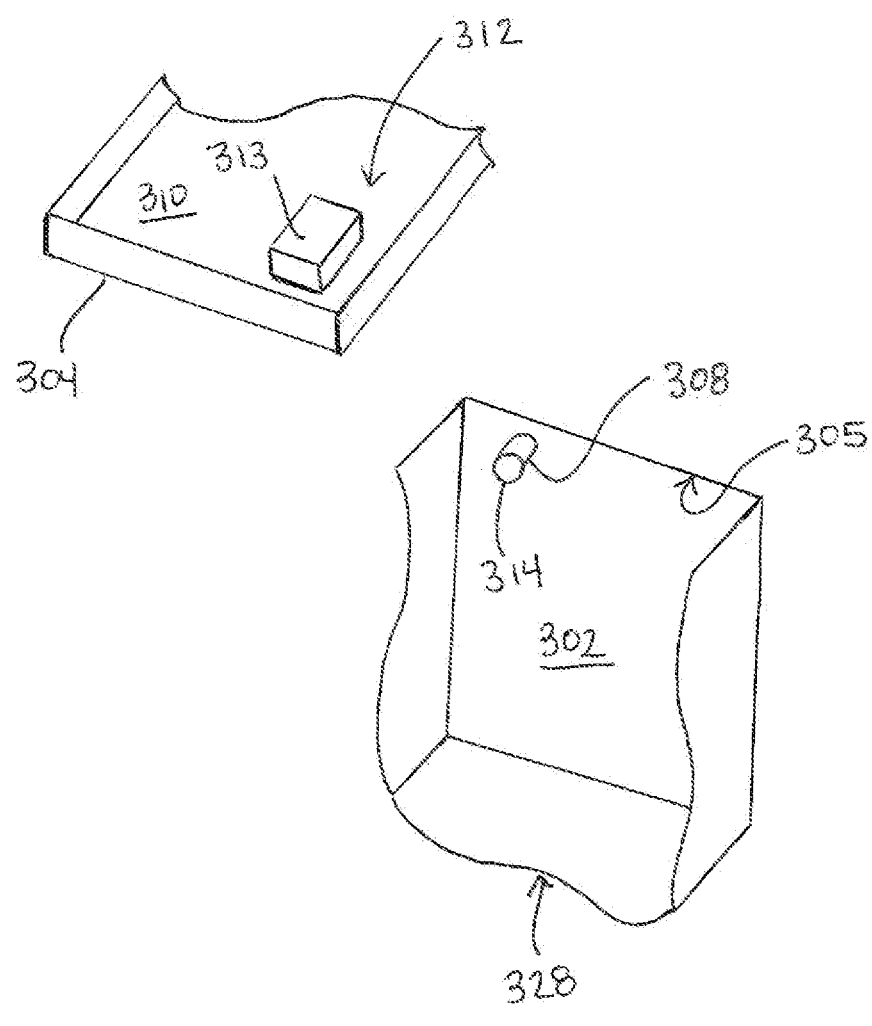
FIG. 9 illustrates a portion of the underside of the lid and a portion of the tank of the livewell system of FIG. 3.

Still referring to FIG. 3 and now also to FIG. 9, in one example, an overflow shutoff 312 is configured to prevent water from flowing out of the tank 302 via the overflow outlet 308 when the lid 304 is secured over the opening 305. In one such example, the overflow shutoff 312 comprises a cover 313 coupled to the underside 310 of the lid 304 (see FIG. 9), and the overflow shutoff cover 313 is configured to block an upstream end 314 of the overflow outlet 308 when the lid 304 is secured over the opening 305. For example, the overflow shutoff cover 313 can be a block or flap of material (such as, but not limited to plastic, rubber, or Styrofoam) that is attached to or integrally formed with the underside 310 of the lid 304. The overflow shutoff cover 313 is located on the underside 310 of the lid 304 and sized such that it eclipses the upstream end 314 of the overflow outlet 308 at least when the lid 304 is in place and secured over the opening 305 in the upper end 306 of the tank 302. In some instances, the material of the cover 313 and/or overflow outlet 308 might be such that a small amount of water is still able to leak out of the overflow outlet 308, but this amount would be negligible when compared to the overflow outlet 308 not being blocked at all by the cover 313.

Figure 4:
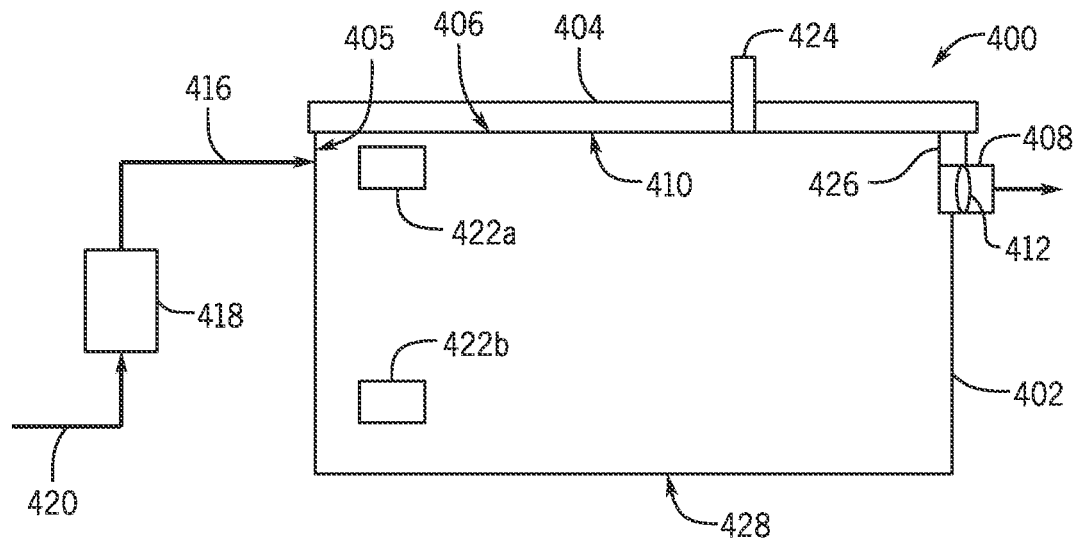
FIG. 4 illustrates another example of a livewell system that is operable in an overfill configuration.

Referring briefly to FIG. 4, in another such example, the overflow shutoff 412 comprises a valve controlling flow of water through the overflow outlet 408, and the valve is configured to be closed automatically in response to the lid 404 being secured over the opening 405. For example, the livewell system 400 may include a switch 426 or sensor that when actuated causes the overflow shutoff valve 412 (which, in this example, is electrically actuated) to close. For example, the switch 426 can be a normally open pushbutton momentary switch that is closed by the weight of the lid 404. The valve may be a butterfly valve or other suitable type of electrically actuated valve. A power source (not shown) is provided for actuating the valve in response to closure of the switch 426. In other examples, the valve is not electrically actuated, but instead manually actuated. For example, the valve may be a spring-loaded gate valve that is pushed downwardly to block the overflow outlet 408 when the lid 404 is in place and springs back upwardly to open the overflow outlet 408 when the lid 404 is removed. Other electrically and manually actuated valves could be used.

Referring back to FIG. 3, the livewell system 300 further comprises a water inlet 316 configured to allow water to enter the tank 302. The water inlet 316 is shown schematically as an arrow in FIG. 3, but some examples thereof include the aerator spray heads 110, 210 shown and described hereinabove. Other water inlets may include a hose extending through a hole or fitting in the wall of the tank 302, or even a hose simply draped over the upper end 306 of the tank 302. A pump 318 is configured to provide water to the tank 302 via the water inlet 316. In this example, the pump 318 draws from the body of water in which the marine vessel is operating, as shown by arrow 320, similar to the example shown in FIG. 1. However, the livewell system 300 could be a recirculating one in which the pump 318 draws water from the tank 302, as shown in FIG. 2. In still other examples, the pump 318 is configured with hoses, passageways, and valving that allow the pump 318 to draw from either the body of water in which the marine vessel is operating or from the tank 302.

Once the overflow shutoff 312 has closed the overflow outlet 308 so that very little or no water can flow therethrough, the pump 318 is activated to fill the tank 302 to an overfill condition. In one example, the pump 318 is configured to start providing water to the tank 302 in response to a determination that the marine vessel on which the livewell system 300 is installed is moving or may be moving soon. For example, the pump 318 could be turned on in response to an engine or motor speed sensor on the marine propulsion device sensing that the engine or motor is running, or running above a predetermined threshold. In another example, the pump 318 could be turned on in response to a vessel speed sensor or a GPS device indicating that the vessel is moving, or is moving at greater than a predetermined speed. In still another example, the pump 318 could be turned on in response to a signal from a user input device (such as a throttle lever or joystick) indicating that the operator has commanded the marine vessel to move. Alternatively, the pump 318 could be started in response to a switch (see switch 426) or sensor that is actuated or activated in response to the lid 304 being secured over the opening 305. Alternatively, the pump 318 could be started in response to a user input to a user input device, such as, but not limited to, pressing of an overfill button on the tank 302 or lid 304 or selection of an overfill option on a touchscreen at the marine vessel's helm or via an application accessible from a user's personal electronic device.

An air emittance valve 324 is located in the lid 304 or in a wall of the tank 302 adjacent the upper end 306 of the tank 302. When the lid 304 is secured over the opening 305 at the upper end 306 of the tank 302, the air emittance valve 324 is configured to allow air to escape from the tank 302 as the pump 318 fills the tank 302 with water. The air emittance valve 324 is a one-way mechanical pressure-activated valve that opens when the pressure within the tank 302 exceeds the atmospheric pressure outside the tank 302, due to air inside the tank 302 being compressed as water fills the tank 302. Thus, it can be imagined that the lid 304 is sealed on the tank 302 with a gasket or similar seal that does not allow water or air to escape, or at least not to escape as easily as they otherwise could via the valves and/or vents provided for such purposes. The air emittance valve 324 acts similarly to an air admittance valve (or Studor vent) in a plumbing system.

A sensor 322 is configured to determine whether substantially the entire upper surface of the water in the tank 302 is contacting the underside 310 of the lid 304 as the pump 318 fills the tank 302. Recall that the overflow outlet 308 has been closed by the overflow shutoff 312, so if the tank 302 is filled too much, water will start to leak out between the tank 302 and the lid 304 in spite of any seal therebetween. In order to fill the tank 302 to an overfill condition that prevents sloshing, but not so much that water spills out of the tank 302, the pump 318 is configured to stop providing water to the tank 302 in response to the sensor 322 determining that substantially the entire upper surface of the water in the tank 302 is contacting the underside 310 of the lid 304. In one such example, the sensor 322 is configured to sense a pressure in the tank 302, and the pump 318 is configured to stop providing water to the tank 302 in response to the pressure in the tank 302 exceeding a predetermined pressure threshold. For example, the sensor 322 can be a pressure transducer that generates an electrical signal in proportion to the pressure it measures. The sensor 322 can be placed near the bottom end 328 of the tank 302 in one example, and a desired height of the water above the sensor 322 (e.g., just up to the upper end 306 of the tank 302), the density of water, atmospheric pressure, and acceleration due to gravity can be used to determine the threshold pressure at which the pump 318 will be turned off.

In another such example, as shown in FIG. 4, sensors 422a, 422b are configured to sense a level of the water in the tank 402, and the pump 418 is configured to stop providing water to the tank 402 in response to the level of water in the tank 402 reaching a predetermined level. For example, a lower water level sensor 422b can be placed near the bottom end 428 of the tank 402 and an upper water level sensor 422a can be placed near the upper end 406 of the tank 402. The water level sensors 422a,b can be non-contact sensors such as electromagnetic field sensors, radio-frequency sensors, capacitive sensors, ultrasonic sensors, or magnetic sensors, or could be float switches. In addition to being turned off when the upper water level sensor 422a senses water, the pump 418 could be turned on when the lower water level sensor 422b does not sense water, to ensure that the tank is always filled with at least some water.

In some examples, a current sensor is provided on the pump 318, 418 to sense a change in pump flow or pressure. The information from the current sensor can additionally or alternatively be used to determine when the tank 302, 402 is nearing maximum capacity for purposes of turning off the pump 318, 418, such as if the current sensor senses a spike in current indicating that backpressure on the pump 318, 418 has increased due to the water inlet 316, 416 being submerged.

Unless otherwise indicated, the components of the livewell system 400 of FIG. 4 that are not explicitly described herein are the same as those with like numbering described with respect to FIG. 3 and function in a similar manner, and vice versa.

Now turning to FIG. 5, in another example of a livewell system 500 according to the present disclosure, the lid 504 comprises a protruding lower portion 530 that is configured to extend below the upper end 506 of the tank 502 when the lid 504 is secured over the opening 505. The protruding lower portion 530 comprises the underside 510 of the lid 504 that is configured to contact substantially the entire upper surface of the water in the tank 502. The protruding lower portion 530 may be integrally formed as part of the lid 504 or may be a second component that is attached to what would otherwise be the underside of the lid 504. The attachment could be made by adhesive, bolts or screws, tongue and groove, or any other known type of attachment. The protruding lower portion 530 can be made of the same material as the remainder of the lid 504 or of a different type of material. If the protruding lower portion 530 is made of a different material than the remainder of the lid 504 and is integrally formed with the remainder of the lid 504, such integral forming can be made by co-molding, over-molding, or another known technique.

The protruding lower portion 530 has an outer perimeter that is smaller than the inner perimeter of the opening 505 in the upper end 506 of the tank 502, such that the protruding lower portion 503 can be inserted into the opening 505 and extend down into the tank 502. In some embodiments, the shape of the footprint of the protruding lower portion 530 is the same as the shape of the opening 505. However, in other examples, the two have different shapes, so long as the protruding lower portion 530 is able to fit within the opening 505. The size and shape of the protruding lower portion 530 are ideally similar to that of the footprint of the tank 502, such that the entire or nearly the entire upper surface of the water in the tank 502 is contacted by the protruding lower portion 530 when the lid 504 is secured over the opening 505. For this reason, it may be preferable that the livewell system 500 of FIG. 5 have an opening 505 that is roughly the same size and shape as the upper end 506 of the tank 502. Otherwise, if the lid covered an opening that was significantly smaller than the remainder of the upper end of the tank, the protruding lower portion might not be large enough to contact substantially all of the upper surface of the water to prevent sloshing in the tank, as the dimensions of the protruding lower portion would be limited in size by the opening through which it must fit.

The protruding lower portion 530 may be of any suitable dimension in the height direction, such as between about 3 inches to about 5 inches. The protruding lower portion 530 may be slightly smaller in outer lateral dimensions than the walls of the tank 502, as shown herein, in order to allow for water to exit the overflow outlet 508 as the protruding lower portion 530 displaces water in the tank 502 as the lid 504 is lowered through the opening 505. A check valve 532 may be provided in the lid 504 or in a wall of the tank 502 proximate the upper end 506 of the tank 502. Here, the check valve 532 is provided in the overflow outlet 508. The check valve 532 is configured to allow water that is displaced by the protruding lower portion 530 of the lid 504 to flow out of the tank 502. In other examples, the protruding lower portion 530 is located, sized, and shaped to act as an overflow shutoff for the overflow outlet 508 (refer to the example of FIG. 3), in which case the check valve might be provided in the lid 304 or higher up on the wall of the tank 502 than the overflow outlet 508. This would allow for water to fill the tank 302 higher than height the closed overflow outlet 508, while still allowing for controlled escape of water that is displaced by the protruding lower portion 530.

In some examples, the dimensions, specifically the height dimension, of the protruding lower portion 530 may be variable. For example, the protruding lower portion 530 may include a number of blocks, each of which is separately connectable to the others to form a variable-height "stack" that depends from the underside of the lid 504. In another example, the protruding lower portion 530 may be an elastic or elastomeric bladder, which can be filled manually or electrically with air, water, or another gas or fluid to change its volume and thus how far it extends into the tank 502. In one such example, the user may inflate or fill the bladder until water begins to leak from the check valve 532.

It should be noted that the components and control aspects of the livewell systems 300, 400 could be incorporated into the livewell system 500. That is, in addition to the lid 504 having the protruding lower portion 530, the livewell system 500 could also be provided with the ability to automatically fill with water in response to any of the above-noted conditions (closing of the lid 504, movement or imminent movement of the marine vessel, etc.) and/or with the ability to automatically stop filling the tank 502 when a sensor senses that the pressure or water level is above a threshold. In this way, if the water level in the tank is not already high enough to touch the protruding lower portion 530, additional water can be provided to fill any remaining gap.

Figure 5:
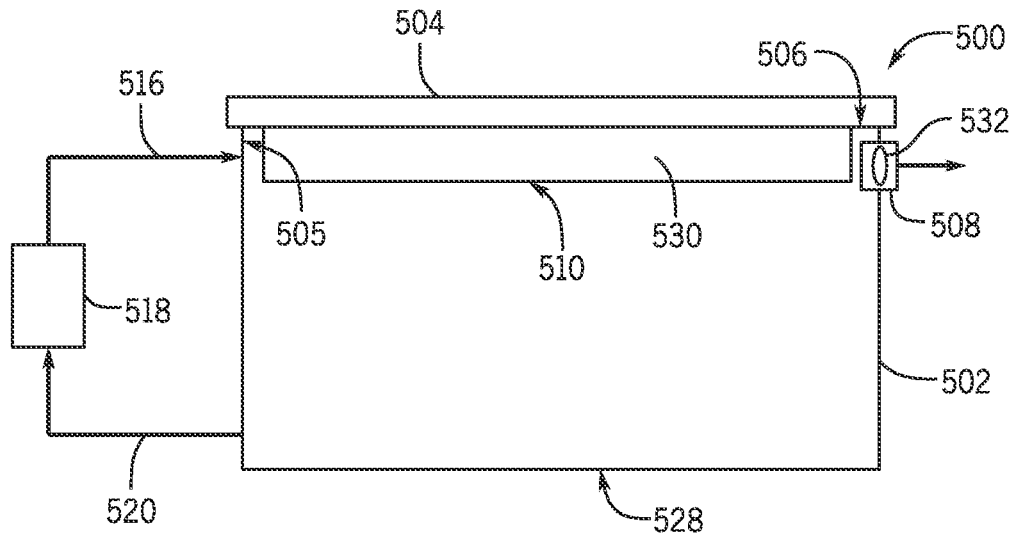
FIG. 5 illustrates another example of a livewell system according to the present disclosure, the livewell system including a lid having a protruding lower portion.

Unless otherwise indicated, the components of the livewell system 500 of FIG. 5 that are not explicitly described herein are the same as those with like numbering described with respect to FIGS. 3 and 4 and function in a similar manner, and vice versa. Note that the pump 518 recirculates water drawn from the tank 502, as shown by arrow 520, in contrast to the arrangement of the livewell systems 300, 400. However, any of the livewell systems 300, 400, 500 could have a pump that draws water from the body of water in which the marine vessel is operating (see FIG. 1), a pump that recirculates water from the tank (see FIG. 2), a pump that alternates between providing fresh water and recirculated water, or two separate pumps (one providing fresh water and the other recirculating water, see FIG. 7).

Regardless of whether the pumped water is fresh or recirculated, it may be pumped into the tank via an aerator spray head at the water inlet 316, 416, 516, as noted herein above. Because the livewell systems 300, 400, 500 described herein are intended to eliminate or nearly eliminate any air gap between the upper surface of the water in the tank and the underside of the lid, such as by overfilling the tank and/or providing the lid with a protruding lower portion, the aerator spray head will most likely be submerged in water. In known systems, water in the tank is typically oxygenated by the water coming from the aerator spray head, which is broken into small droplets by the configuration of the spray head. Collectively, these small water droplets have a large surface area through which oxygen can be transferred. These water droplets break the surface of the water in the tank and mix with the rest of the water, thus transferring oxygen into the livewell. However, if the aerator spray head is submerged, there is no transfer of oxygen between the droplets and the air. Thus, the present inventors developed an assembly that allows for water to be oxygenated even when pumped through a submerged aerator spray head.

Figure 6:
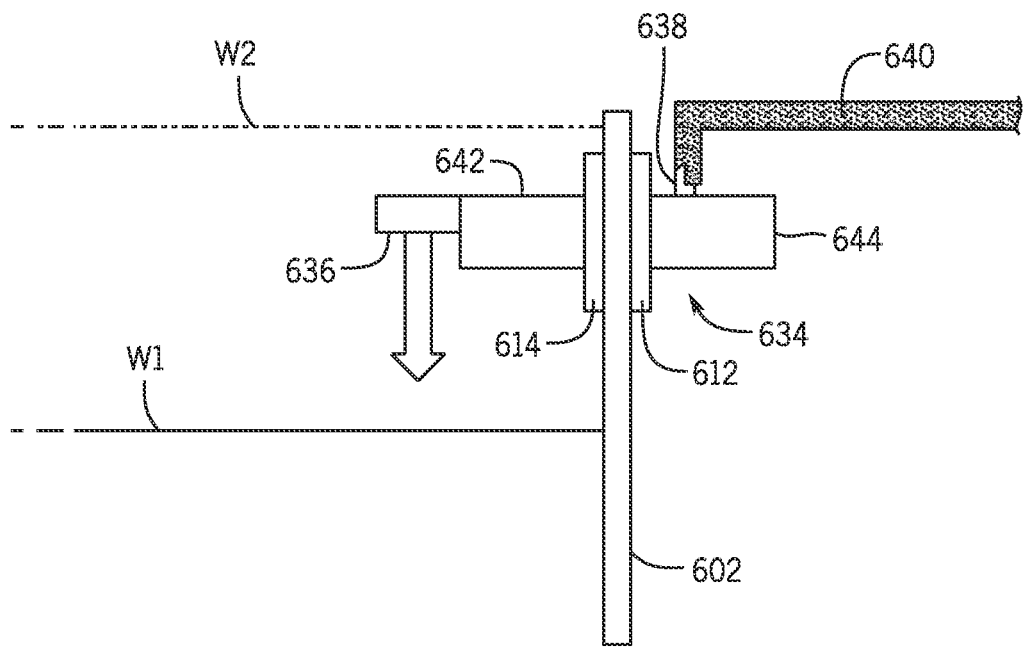
FIG. 6 illustrates a hybrid aerator spray head and venturi fitting configured for use with the livewell systems of any of FIGS. 1-5 or the tank of FIG. 7.

As shown in FIG. 6, any of the livewell systems 300, 400, 500 may include a hybrid aerator spray head and venturi fitting 634 coupled to the tank 602. The hybrid aerator spray head and venturi fitting 634 is configured to provide oxygenated water into the tank 602 both when an outlet 636 of the hybrid aerator spray head and venturi fitting 634 is submerged in the water (see water level W2) in the tank 602 and when the outlet 636 is not submerged in the water (see water level W1). An air inlet 638 is coupled to the hybrid aerator spray head and venturi fitting 634, which air inlet 638 may in turn be connected to an air hose 640 having an upstream end located where it can draw in fresh air. The air inlet 638 is configured to allow air to oxygenate the water flowing through the hybrid aerator spray head and venturi fitting 634. The hybrid aerator spray head and venturi fitting 634 may have a restricted flow section adjacent to the air inlet 638 or downstream near the water outlet 636, as shown by the smaller diameter of the water outlet 636 in comparison to that of the main body 642 of the fitting 634. The restricted flow section creates turbulence that causes the air entering through inlet 638 to mix with the water in the fitting 634, thus oxygenating the water. In some cases, this may allow a smaller aerator pump to be used to provide the same level of oxygenation as a larger pump might provide were the hybrid aerator spray head and venturi fitting 634 not used. The fitting 634 is supported within a hole in the tank 602 by a flange 612 and nut 614, similar to the embodiment described with respect to FIG. 1. The fitting's inlet 644 may be connected to a hose and provided with water from a pump, as noted hereinabove. The hybrid aerator spray head and venturi fitting 634 described herein is not the only type of fitting capable of aerating water when submerged, and some examples of suitable alternative aeration apparatuses are shown in FIGS. 1 and 3 of U.S. Pat. No. 5,876,639.

Thus, according to the examples of the present disclosure, a system 300, 400 500 for providing oxygenated air to aquatic life comprises a tank 302, 402, 502 configured to hold water in which the aquatic life is to be placed, a lid 304, 404, 504 configured to seal an upper end 306, 406, 506 of the tank 302, 402, 502, and a hybrid aerator spray head and venturi fitting 634 coupled to the tank 302, 402, 502 and configured to provide oxygenated water into the tank 302, 402, 502. The tank 302, 402, 502 and lid 304, 404, 504 are configured such that when the lid 304, 404, 504 is sealing the upper end 306, 406, 506 of the tank 302, 402, 502 and the tank 302, 402, 502 is filled with water, substantially no air gap is present between an upper surface of the water and a lower surface 310, 410, 510 of the lid 304, 404, 504. The hybrid aerator spray head and venturi fitting 634 is configured to provide oxygenated water into the tank 302, 402, 502 both when an outlet 636 of the hybrid aerator spray head and venturi fitting 634 is submerged in the water in the tank 302, 402, 502 and when the outlet 636 is not submerged in the water.

In some examples, a pump 318, 418, 518 is configured to provide water to the tank 302, 402, 502 via the hybrid aerator spray head and venturi fitting 634. An air inlet 638 is coupled to the hybrid aerator spray head and venturi fitting 634, the air inlet 638 configured to allow air to oxygenate the water flowing through the hybrid aerator spray head and venturi fitting 634.

A sensor 322, 422a,b is configured to determine whether an air gap exists between the upper surface of the water and the lower surface 310, 410, 510 of the lid 304, 404, 504. The pump 318, 418, 518 is configured to stop providing water to the tank 302, 402, 502 in response to the sensor 322, 422a,b determining that substantially no air gap is present between the upper surface of the water and the lower surface 310, 410, 510 of the lid 304, 404, 504. By "substantially no air gap," it is meant to include a negligible air gap that does not allow for sloshing in the tank 302, 402, 502. Although what is considered negligible may therefore vary based on the size and configuration of the tank as well as the external forces acting on the tank, an air gap on the order of one inch or less is contemplated.

As noted, the system 300, 400, 500 is configured for installation on a marine vessel, and the pump 318, 418, 518 may be configured to start providing water to the tank 302, 402 502 in response to a determination that the marine vessel is moving or may be moving soon.

In one example, an overflow outlet 308, 408, 508 is located proximate the upper end 306, 406, 506 of the tank 302, 402, 502 and an overflow shutoff 312, 412, 530 is configured to prevent water from flowing out of the tank 302, 402, 502 via the overflow outlet 308, 408, 508 when the lid 304, 404, 504 is sealing the upper end 306, 406, 506 of the tank 302, 402, 502.

In another example, the lid 504 comprises a protruding lower portion 530 that is configured to extend into the upper end 506 of the tank 502 when the lid 504 is sealing the upper end 506 of the tank 502, and the protruding lower portion 530 comprises the lower surface 510 of the lid 504.

The slight pressurization of the livewell resulting from overfilling the tank or providing the protruding lower portion extending into the tank can advantageously help maintain higher levels of dissolved oxygen in the water held in the tank than might otherwise be achievable were the livewell system not slightly pressurized.

Figure 7:
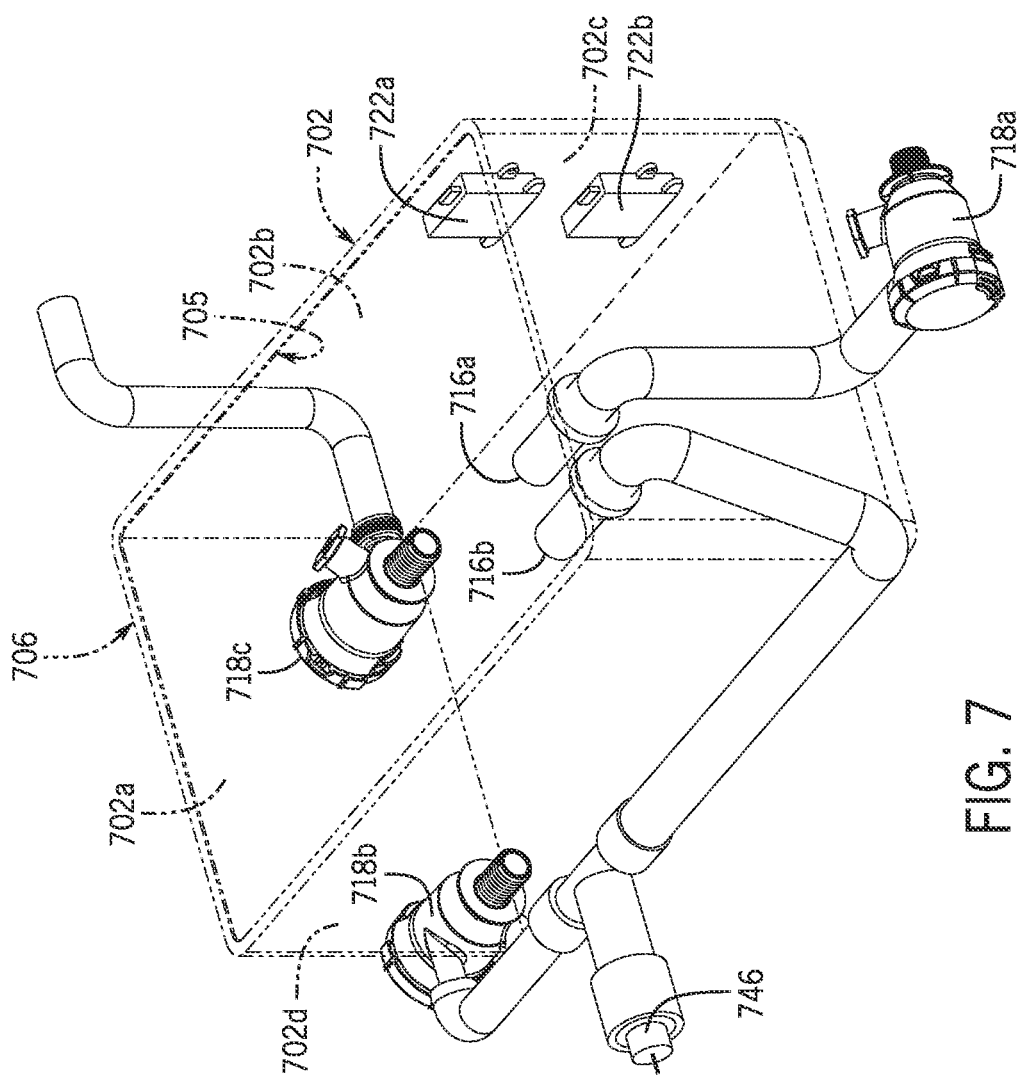
FIG. 7 illustrates one example of a tank for use with the livewell systems of any of FIGS. 3-5.

One example of a tank 702 that may be used with any of the livewell systems 300, 400, 500 is shown in FIG. 7. The tank 702 is generally rectangular and has four walls 702a-d. The four walls 702a-d have upper edges defining an upper end 706 of the tank 702, which has an opening 705 therein. A first pump 718a pumps water from an external body of water into the tank 702 via a first water inlet 716a, which may be a tube, hose, aerator spray head, or hybrid aerator spray head venturi fitting. A second pump 718b recirculates water from the tank 702 via a second water inlet 716b, which again can be any of the above-noted types of inlets. A sensor 746 (such as a dissolved oxygen sensor or temperature sensor) can be provided in a T-shaped coupling between the conduits that connect the second pump 718b to the second water inlet 716b. A third pump 718c can be provided to drain the tank 702 for cleaning or storage. Locations of the upper water level sensor 722a and lower water level sensor 722b are also shown.

Figure 8:
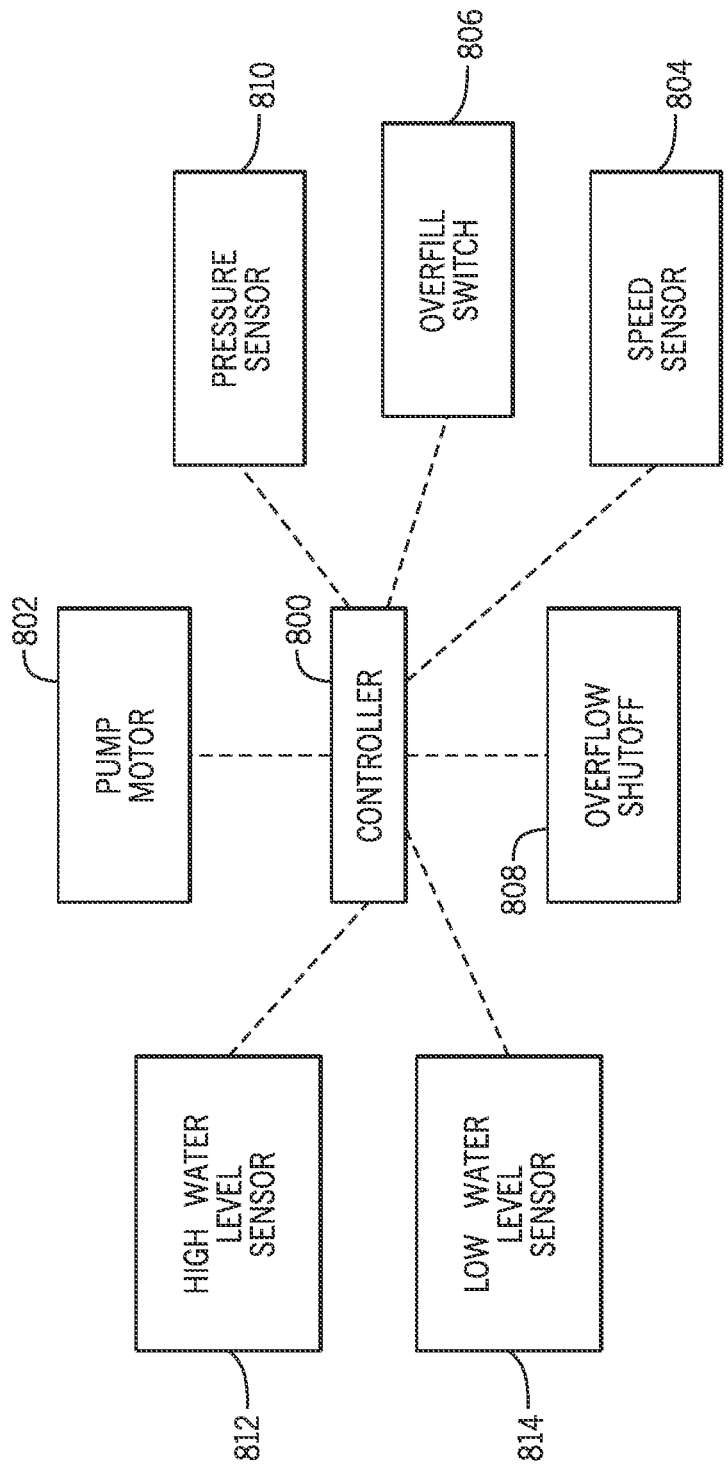
FIG. 8 illustrates a control system for any of the livewell systems of FIGS. 3-5.

FIG. 8 is a schematic diagram used to describe how various electrical components of the livewell systems 300, 400, 500 might interact. A controller 800, including for example a storage system storing computer-executable code and a processing system executing the code, may be provided. The controller 800 is in signal communication with the pump motor 802 in each pump and controls power provided to the pump motor 802 (from a power source such as a battery, not shown) in accordance with the methods noted herein above. For example, the controller 800 may provide power to the pump motor 802 in response to a speed sensor 804 (such as an engine, motor, or vessel speed sensor) indicating that the marine vessel is moving or is about to move. Alternatively, the controller 800 may provide power to the pump motor 802 in response to actuation of an overfill switch 806, such as a switch located on the upper edge of the tank (e.g., switch 426) and actuated by the lid, or a switch or other input actuated by the user. During, before, or after turning on the pump motor 802, the controller 800 may actuate the overflow shutoff 808, such as the overflow shutoff valve 412 noted hereinabove. Once a pressure sensor 810 or high water level sensor 812 senses that the pump has filled the tank enough to eliminate or nearly eliminate the air gap between the upper surface of the water and the underside of the lid, the controller 800 may disconnect the pump motor 802 from the power source to turn the pump off. The controller 800 may also be configured to turn the pump on in the event a low water level sensor 814 does not detect water. Alternatively, the controller 800 may be configured to turn a drain pump (e.g., 718c) off in response to the low water level sensor not detecting water.

The controller 800 may be provided in a separate module or as part of one of the pumps. In some examples, the controller 800 is capable of wireless communication with the cloud via a mobile broadband network or satellite internet service, and portions or all of the algorithms noted herein are stored in the cloud and executed by a central computing system on the cloud. This may allow a user to commence the overfill condition or monitor the pressure or water level in the tank remotely, from a personal electronic device.

In another example, instead of the controller 800, an integrated circuit is provided for connecting some or all of the components in FIG. 8, depending on the requirements of the system.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A livewell system for installation on a marine vessel, the livewell system comprising:
   a tank configured to hold water;
   a lid configured to be secured over an opening at an upper end of the tank;
   an overflow outlet located on the upper end of the tank; and
   an overflow shutoff configured to prevent water from flowing out of the tank via the overflow outlet as a direct consequence of the lid being secured over the opening;
   wherein the tank and lid are configured such that when the lid is secured over the opening and the tank is filled with water, an underside of the lid is configured to contact substantially an entire upper surface of the water; and
   wherein the overflow shutoff comprises a cover depending from the underside of the lid, the cover configured to block an upstream end of the overflow outlet when the lid is secured over the opening.

2. The livewell system of claim 1, further comprising:
   a water inlet configured to allow water to enter the tank; and
   a pump configured to provide water to the tank via the water inlet.

3. The livewell system of claim 2, further comprising a sensor configured to determine whether substantially the entire upper surface of the water in the tank is contacting the underside of the lid;
   wherein the pump is configured to stop providing water to the tank in response to the sensor determining that substantially the entire upper surface of the water in the tank is contacting the underside of the lid.

4. The livewell system of claim 3, wherein the sensor is configured to sense a pressure in the tank, and the pump is configured to stop providing water to the tank in response to the pressure in the tank exceeding a predetermined pressure threshold.

5. The livewell system of claim 3, wherein the sensor is configured to sense a level of the water in the tank, and the pump is configured to stop providing water to the tank in response to the level of water in the tank reaching a predetermined level.

6. The livewell system of claim 2, wherein the pump is configured to start providing water to the tank in response to a determination that the marine vessel is moving, in response to an engine or motor speed sensor sensing that an engine or motor of a marine propulsion device powering the marine vessel is running, and/or in response to a signal from a user input device indicating that an operator has commanded the marine vessel to move.

7. The livewell system of claim 2, further comprising an air emittance valve located in the lid or in a wall of the tank adjacent the upper end of the tank;
   wherein, when the lid is secured over the opening, the air emittance valve is configured to allow air to escape from the tank as the pump fills the tank with water.

8. The livewell system of claim 1, wherein the lid comprises a protruding lower portion that is configured to extend below the upper end of the tank when the lid is secured over the opening, the protruding lower portion comprising the underside of the lid that is configured to contact substantially the entire upper surface of the water.

9. The livewell system of claim 8, further comprising a check valve provided in the lid or in a wall of the tank proximate the upper end of the tank, wherein the check valve is configured to allow water that is displaced by the protruding lower portion of the lid to flow out of the tank.

10. The livewell system of claim 1, further comprising a hybrid aerator spray head and venturi fitting coupled to the tank, wherein the hybrid aerator spray head and venturi fitting is configured to provide oxygenated water into the tank both when an outlet of the hybrid aerator spray head and venturi fitting is submerged in the water in the tank and when the outlet is not submerged in the water.

11. The livewell system of claim 10, further comprising an air inlet coupled to the hybrid aerator spray head and venturi fitting, the air inlet configured to allow air to oxygenate the water flowing through the hybrid aerator spray head and venturi fitting.

12. A system for providing oxygenated air to aquatic life, the system comprising:
    a tank configured to hold water in which the aquatic life is to be placed;
    a lid configured to seal an upper end of the tank;
    a hybrid aerator spray head and venturi fitting coupled to the tank and configured to provide oxygenated water into the tank;
    an overflow outlet located on the upper end of the tank; and
    an overflow shutoff configured to prevent water from flowing out of the tank via the overflow outlet as a direct consequence of the lid sealing the upper end of the tank;
    wherein the tank and lid are configured such that when the lid is sealing the upper end of the tank and the tank is filled with water, substantially no air gap is present between an upper surface of the water and a lower surface of the lid;
    wherein the hybrid aerator spray head and venturi fitting is configured to provide oxygenated water into the tank both when an outlet of the hybrid aerator spray head and venturi fitting is submerged in the water in the tank and when the outlet is not submerged in the water; and
    wherein the overflow shutoff comprises a cover depending from an underside of the lid, the cover configured to block an upstream end of the overflow outlet when the lid is sealing the upper end of the tank.

13. The system of claim 12, further comprising:
    a pump configured to provide water to the tank via the hybrid aerator spray head and venturi fitting; and
    a sensor configured to determine whether an air gap exists between the upper surface of the water and the lower surface of the lid;
    wherein the pump is configured to stop providing water to the tank in response to the sensor determining that substantially no air gap is present between the upper surface of the water and the lower surface of the lid.

14. The system of claim 13, wherein the system is configured for installation on a marine vessel, and wherein the pump is configured to start providing water to the tank in response to a determination that the marine vessel is moving, in response to an engine or motor speed sensor sensing that an engine or motor of a marine propulsion device powering the marine vessel is running, and/or in response to a signal from a user input device indicating that an operator has commanded the marine vessel to move.

15. The system of claim 12, wherein the lid comprises a protruding lower portion that is configured to extend into the upper end of the tank when the lid is sealing the upper end of the tank, the protruding lower portion comprising the lower surface of the lid.

16. The system of claim 12, further comprising an air inlet coupled to the hybrid aerator spray head and venturi fitting, the air inlet configured to allow air to oxygenate the water flowing through the hybrid aerator spray head and venturi fitting.

\* \* \* \* \*